United States Patent
Lehnert et al.

(10) Patent No.: US 7,376,404 B2
(45) Date of Patent: May 20, 2008

(54) SYSTEM AND METHOD FOR DETECTING A FAULT IN A MULTIPLE RECEIVER SYSTEM

(75) Inventors: Martin Lehnert, Erlangen (DE);
Norbert Bogner, Neumarkt (DE);
Gerhard Hertlein, Hoechstadt (DE)

(73) Assignee: Lucent Technologies Inc., Murray Hill, NJ (US)

( * ) Notice: Subject to any disclaimer, the term of this patent is extended or adjusted under 35 U.S.C. 154(b) by 407 days.

(21) Appl. No.: 10/833,035

(22) Filed: Apr. 28, 2004

(65) Prior Publication Data
US 2005/0245222 A1    Nov. 3, 2005

(51) Int. Cl.
*H04B 17/00* (2006.01)
*H04B 7/08* (2006.01)

(52) U.S. Cl. ................. 455/226.1; 455/158.3; 455/132

(58) Field of Classification Search ......... 455/67.11, 455/67.13, 130, 132, 140, 150.1, 158.3, 226.1, 455/277.1, 277.2
See application file for complete search history.

(56) References Cited

U.S. PATENT DOCUMENTS

| | | | | |
|---|---|---|---|---|
| 4,530,087 A | * | 7/1985 | Yamamoto | 370/350 |
| 5,937,005 A | * | 8/1999 | Obuchi et al. | 375/224 |
| 6,282,408 B1 | * | 8/2001 | Jang | 455/67.13 |
| 6,704,377 B1 | * | 3/2004 | Hsuan | 375/346 |
| 6,711,405 B2 | * | 3/2004 | Ostrup et al. | 455/424 |
| 6,744,748 B1 | * | 6/2004 | Boulton et al. | 370/333 |
| 6,792,031 B1 | * | 9/2004 | Sriram et al. | 375/147 |
| 6,920,591 B2 | * | 7/2005 | Bauman | 714/704 |

FOREIGN PATENT DOCUMENTS

GB    2 276 297 A    *    9/1994

* cited by examiner

*Primary Examiner*—Sonny Trinh

(57) ABSTRACT

A system and method for receiving output signals from each receiver of multiple receivers, the output signals generated based on receipt of a same transmission; incrementing a count value associated with each receiver based on the output signals; and determining whether a fault in a receiver exists based on the associated count values of the receivers.

12 Claims, 2 Drawing Sheets

SYSTEM AND METHOD FOR DETECTING A FAULT IN A MULTIPLE RECEIVER SYSTEM

BACKGROUND OF THE INVENTION

Receivers in a multiple receiver system occasionally suffer from faults such as poor calibration or hardware malfunction. If the fault goes uncorrected, then information may not be properly received by the multiple receiver system causing faulty voice and/or data communications. Accordingly, multiple receiver systems tend to employ fault detection methods to find these faults and permit timely correction thereof.

In a first example of a conventional fault detection method, a pilot signal is transmitted by a first radio system. The pilot signal is then received by a second radio system. The received pilot signal is processed by a second radio system receiver and then output to other components of the second radio system. The output power of the receiver in the second radio system, as a response to the pilot signal is then compared against the pilot signal transmit power from the first radio system. If a significant power difference exists between the pilot signal transmit power of the first radio system and the output power of the second radio system receiver as a result of the pilot signal, a fault is determined to exist in the second radio system. Problems with this approach for detecting a fault are that two radio systems are needed, one for transmitting a pilot signal and one for receiving the pilot signal. Additionally, extra energy is needed to generate a pilot signal solely for fault detection purposes. Furthermore, it may be difficult to determine which receiver system is faulty where there is more than one receiver system in the second radio system.

In a second example of a conventional fault detection method, only one radio system is used. In the second example of a fault detection system, a pilot signal is output by a first radio system. The pilot signal output is then received by the same radio system—the first radio system. The received pilot signal is then processed by a receiver in the first radio system. The output power of the first radio system receiver is then compared against the original pilot signal output power. If a significant difference in power exists between the output of the first radio system pilot signal and the output of the first radio system receiver, a fault is determined to exist in the first radio system. Problems associated with this approach are that extra energy may be needed to generate the extra pilot signal only for fault detection purposes. Additionally, it may be difficult to determine which receiver system is faulty where there is more than one receiver system in the first radio system.

In a third example of the conventional art, an uplink signal is received from a mobile unit by a first radio system. A receiver of the first radio system determines the power of the uplink signal received. If the received signal strength indicator (RSSI) value is below a set threshold, a fault may be determined to exist in the first system. A problem with this approach is that it may be difficult to determine which receiver system is faulty where there is more than one receiver system in the first radio system.

SUMMARY OF TH INVENTION

The present invention relates to a system and method for detecting a fault in a multiple receiver system. In an example embodiment, a fault is detected by receiving output signals from each receiver of the multiple receivers, the output signals generated based on receipt of a same transmission; incrementing a count value associated with each receiver based on the output signals; and determining whether a fault in a receiver exists based on the associated count values of all receivers.

In another example embodiment of the invention, a system for detecting a fault in a multiple receiver system includes a control unit connected to multiple receivers. The control unit receives output signals from each receiver of the multiple receivers, the output signals generated based on receipt of a same transmission; increments a count value associated with each receiver based on the output signals; and determines whether a fault in a receiver exists based on the associated count values of all receivers.

Advantages of the method and system for detecting a fault in a multiple receiver system of the present invention are that only one radio system with multiple receivers may be needed to detect a fault. This helps save hardware costs as well as deployment and calibration costs associated with hardware. Furthermore no extra energy may be needed to generate a extra pilot signal that is used only for fault detection. In addition, with the present invention, a fault in a particular receiver system of a multiple receiver system may be determined. Moreover, a software embodiment of the invention may allow flexibility to react to different scenarios and to upgrade the fault detector process when desired.

BRIEF DESCRIPTION OF THE DRAWINGS

The present invention will become more fully understood from the detailed description given below and the accompanying drawings, wherein like elements are represented by like reference numerals, which are given by way of illustration only and, thus, are not limiting on the present invention and wherein:

FIG. 1 illustrates a block diagram of a network including a fault detection detector according to an example embodiment of the invention; and.

DETAILED DESCRIPTION OF EXAMPLE EMBODIMENTS

In an example embodiment of the invention, a fault detector may be used to determine whether a wideband code division multiple access (WCDMA) receiver is faulty. Information regarding an uplink signal of a mobile unit or other radio transmit device may be used by a fault detector to determine whether a fault in a receiver is present. The fault may be detected by taking advantage of existing WCDMA resources.

In an example embodiment of the invention, a fault detector receives classification values from at least two receivers located in a base station. The classification values may be based on the outputs of the at least two receivers. The at least two receivers process signal information of signals received from at least two antennas. Each of the antennas receive the same uplink signal from a mobile unit or other radio transmit device. First described is an example embodiment of a network that may be used in detecting a fault in a receiver. Next described is an example fault detector algorithm according to an example embodiment of the invention.

Figure 1:
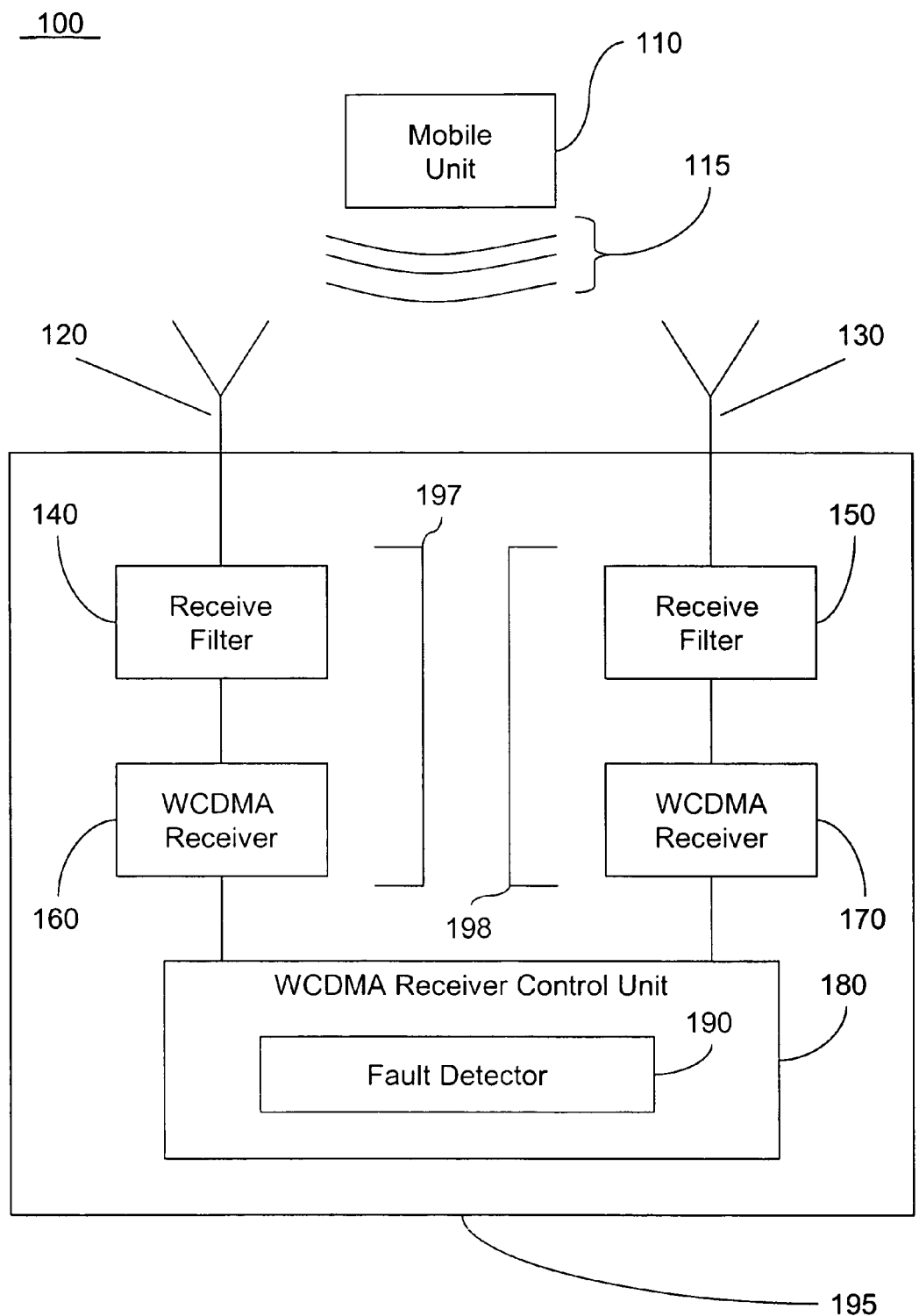

FIG. 1 illustrates a block diagram of a network including a fault detector according to an example embodiment of the present invention in FIG. 1, a network 100 is showing including at least one mobile unit 110 and at least one base station 195.

According to an example embodiment, the mobile unit 110 transmits an uplink signal 115 to the base station 195, which may receive the uplink signal 115 using the antennas 120, 130. The signal received by the base station 195 may be processed in parallel along two separate paths 197, 198. Each separate path includes a receive filter 140, 150, a WCDMA receiver 160, 170, and a connection to a WCDMA receiver control unit 180. The WCDMA receiver control unit 180 may include a fault detector 190.

The uplink signal is filtered in parallel by receive filters 140, 150 where unwanted frequencies are filtered out of the signal. The filtered signal may then be processed by WCDMA receivers 160, 170.

The WCDMA receivers 160, 170, also working in parallel, despread the filtered signal and assign a rake finger for processing of the filtered signal. Each of the WCDMA receivers 160, 170, correlate the filtered signals with a known pattern. Each WCDMA receiver 160, 170 may also produce several classification values, as known in the art, that are accessible by the WCDMA control unit 180. Such classification values may include signal magnitude information, input path information, timing information, and/or assigned rake finger information. The WCDMA receiver output is then sent to the WCDMA control unit 180 where the signals are further processed.

Within the WCDMA receiver control unit 180 may be a fault detector 190. The fault detector 190 may be software and/or hardware that may invoke an algorithm used to process the classification values output from each of the WCDMA receivers 160, 170 to determine whether a fault in one of the WCDMA receivers 160, 170 is present. A fault may be due to poor calibration, due to a hardware failure or other problem within one or more of the WCDMA receivers 160, 170 that affects signal reception. While the fault detector 190 is disclosed to be within the WCDMA receiver control unit 180, the fault detector 190 may, in an alternative example embodiment, be separate from the WCDMA receiver control unit 180.

Figure 2:
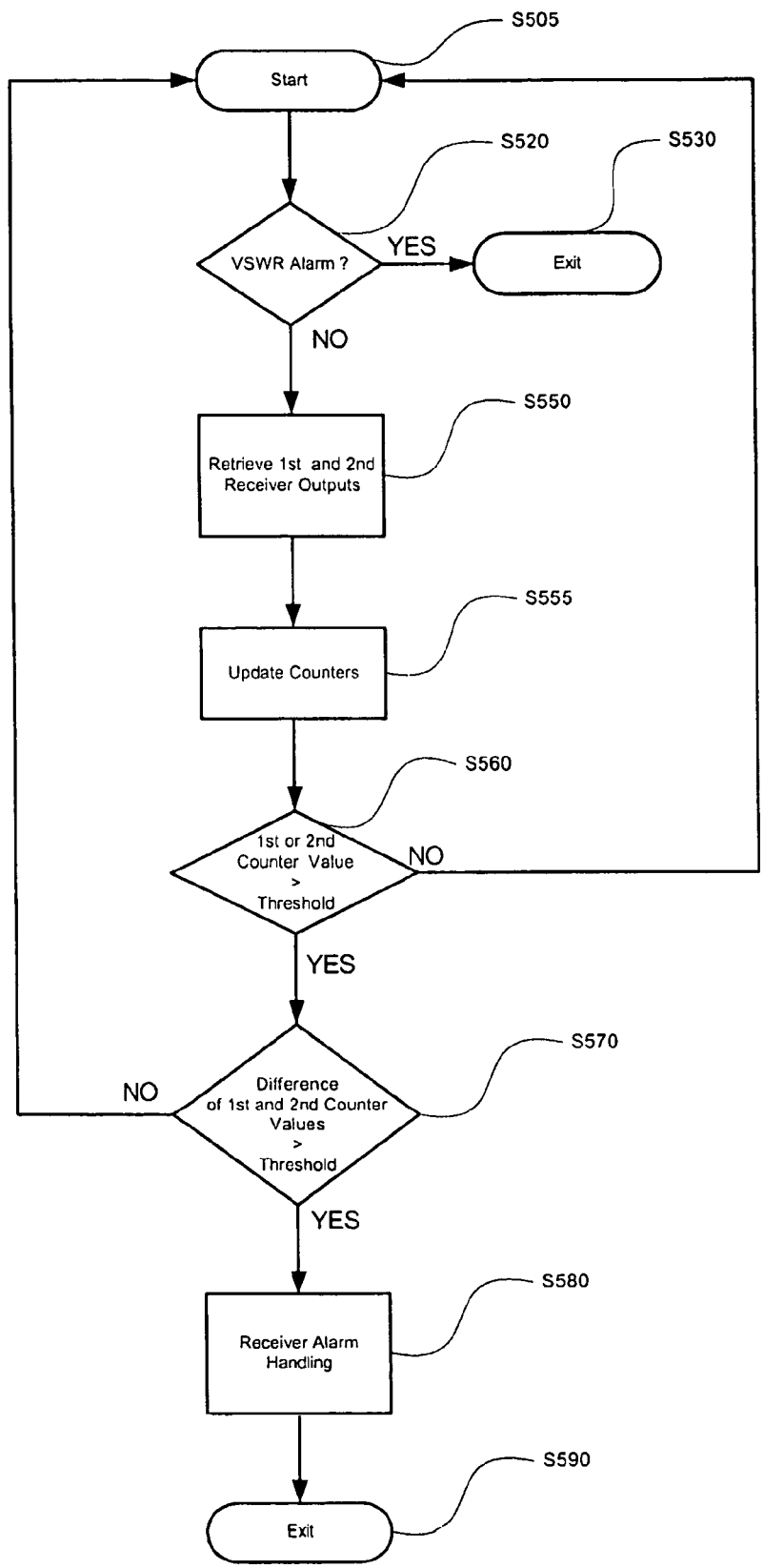
FIG. 2 illustrates a flow chart of a fault detector process according to an embodiment of the invention.

The algorithm used by the fault detector 190 exploits differences between WCDMA receivers 160, 170 based on the classification values output from the WCDMA receivers 160, 170. FIG. 2 further describes the algorithm used by the fault detector 190.

FIG. 2 is an illustrative flow chart of a fault detector process according to an embodiment of the invention. The fault detector process starts at step S505 and continues on to step S520. As shown, by step S520 the fault detector 190 may check whether a voltage standing wave ratio (VSWR) alarm has been triggered. That is, whether the VSWR alarm output reflects a high VSWR. A VSWR alarm is a common feature of a base station. The VSWR alarm output may be used by the fault detector 190 to help isolate a receiver fault. However, the checking of the VSWR alarm is not necessary to detect a fault in a multiple receiver system. A VSWR may be high due to a wrong antenna, bad cable, ice on the antenna, etc. If the VSWR alarm has been triggered, the fault detector process exits S530 so that conditions of the network 100 that may have triggered the VSWR alarm may be corrected. Checking the status of the VSWR alarm may help eliminate factors that may affect WCDMA receiver 160, 170 output other than a WCDMA receiver fault. With the other factors eliminated, the fault detector 190 may be able to more accurately detect a fault in the WCDMA receivers 160, 170.

If there is no VSWR alarm, the fault detector 190 retrieves an instance of the classification values output from the WCDMA receivers 160, 170 in step S550. For illustrative purposes, classification values are shown as being retrieved from the first WCDMA receiver 160 and the second WCDMA receiver 170. These classification values may include signal magnitude information, input path information, timing information, and assigned rake finger information for each of the WCDMA receivers, 160, 170.

The classification values may be used by the fault detector 190 in step S555 to update a first counter associated with the first WCDMA receiver 160 and a second counter associated with the second WCDMA receiver 170. The first and second counters of the WCDMA receivers 160, 170 may be implemented in software or hardware and may maintain a count based on when a WCDMA receiver is processing information.

For example, the counter for a WCDMA receiver may be updated when the signaling magnitude information of a WCMDA receiver indicates a set power threshold has been reached by the WCDMA receiver associated with the counter, the input path information indicates that a signal has been received by the WCDMA receiver associated with the counter, the timing information indicates that a signal has been received by the WCDMA receiver associated with the counter, the assigned rake finger information indicates that a signal has been received by the WCDMA receiver associated with the counter, or a combination thereof. Alternatively, the magnitude information could be used directly to update the counter. For example, if the magnitude information indicates a magnitude of 10, then the counter may be set to 10 or a value of ten may be added to an existing value of the counter.

After the updating step, S555, counter values for each of the WCDMA receivers 160, 170 are compared in step, S560. If both of the counter values are less than a set threshold, then the fault detector process loops back to step S505. Otherwise, the counter values are again compared, S570. If both counter values do not differ by more than a set amount, then the fault detector process loops back to step S505. If, however, the counter values differ by more than this set amount, this indicates that there is a fault in at least one of the receivers and receiver alarm handling occurs, S580. Receiver alarm handling S580 may include the sending of an alarm message indicating that a fault in one or more of the WCDMA receivers 160, 170 is present to an operator or a process that handles receiver faults. The fault message may indicate which of the WCDMA receivers 160, 170 is faulty. The faulty receiver may be the receiver with the lower counter value associated with it.

In an example embodiment of the invention, the adding of hardware to determine a fault in each receiver may be avoided which helps save hardware costs as well as deployment and calibration costs associated with hardware. Further, the transmission of an extra signal such as a pilot signal is not needed to determine a fault in a receiver. Moreover, a software fault detector in software may allow flexibility to react to different scenarios and to upgrade the fault detector process when desired.

The invention being thus described, it will be obvious that the same may be varied in many ways. For example, while the embodiments of the present invention were described with respect to a WCDMA receiver, it will be appreciated that the present invention is equally applicable to other types of receivers. Such variations are not to be regarded as a departure from the spirit and scope of the invention, and all such modifications as would be obvious to one skilled in the art are intended to be included within the scope of the present invention.

We claim:

1. A method for detecting a fault in a multiple receiver system, comprising:

receiving output signals from each receiver of the multiple receivers, the output signals generated based on receipt of a same transmission and including at least one of magnitude information and rake finger information for each receiver;

incrementing a count value associated with at least one receiver if the output signals of the at least one receiver indicate a threshold has been reached by the at least one receiver based on the at least one of the magnitude information and the rake finger information of the at least one receiver; and determining whether a fault in a receiver exists based on the associated count values of the receivers.

2. The method of claim 1, wherein the incrementing step increments the count value associated with the receiver based on magnitudes of the output signals.

3. The method of claim 1, wherein the output signals include input path information for each receiver, and the incrementing step includes incrementing the count value of at least one receiver when the output signals of the at least one receiver indicate that a signal has been received by the at least one receiver based on the input path information of the at least one receiver.

4. The method of claim 1, wherein the output signals include timing information for each receiver, and the incrementing step includes incrementing the count value of at least one receiver when the output signals indicate that a signal has been received by the at least one receiver based on the timing information of the at least one receiver.

5. The method of claim 1, wherein the determining step determines that the fault exists in the receiver when the associated count value differs by more than a set amount from the count values associated with the other receivers in the multiple receiver system.

6. The method of claim 1, further comprising:

sending an alarm message when the determining step determines a fault is present.

7. A system for detecting a fault in a multiple receiver system comprising:

a control unit connected to multiple receivers, the control unit receives output signals from each receiver of the multiple receivers, the output signals generated based on receipt of a same transmission and including at least one of magnitude information and rake finger information for each receiver; increments a count value associated with at least one receiver if the output signals of the at least one receiver indicate a threshold has been reached by the at least one receiver based on the at least one of the magnitude information and the rake finger information of the at least one receiver; and determines whether a fault in a receiver exists based on the associated count values of the receivers.

8. The system of claim 7, wherein the control unit further increments the count value associated with the receiver based on magnitudes of the output signals.

9. The system of claim 7, wherein the output signals include input path information for each receiver, and the control unit further increments the count value of at least one receiver when the output signals of the at least one receiver indicate that a signal has been received by the at least one receiver based on the input path information of the at least one receiver.

10. The system of claim 7, wherein the output signals include timing information for each receiver, and the control unit further increments the count value of at least one receiver when the output signals indicate that a signal has been received by the at least one receiver based on the timing information of the at least one receiver.

11. The system of claim 7, wherein the control unit further determines that the fault exists in the receiver when the associated count value differs by more than a set amount from the count values associated with the other receivers in the multiple receiver system.

12. The system of claim 7, wherein the control unit sends an alarm message when the determining step determines a fault is present.

* * * * *